US008080778B2

(12) United States Patent
McBride

(10) Patent No.: US 8,080,778 B2

(45) Date of Patent: *Dec. 20, 2011

(54) CHANNEL CELL SYSTEM

(75) Inventor: Sterling Eduardo McBride, Princeton, NJ (US)

(73) Assignees: SRI International, Menlo Park, CA (US); The Regents of the University of Colorado, a body Corporate, Denver, CO (US)

( * ) Notice: Subject to any disclaimer, the term of this patent is extended or adjusted under 35 U.S.C. 154(b) by 363 days.

This patent is subject to a terminal disclaimer.

(21) Appl. No.: 12/390,669

(22) Filed: Feb. 23, 2009

(65) Prior Publication Data

US 2009/0212204 A1 Aug. 27, 2009

Related U.S. Application Data

(60) Provisional application No. 61/030,335, filed on Feb. 21, 2008.

(51) Int. Cl.
*G21K 5/00* (2006.01)
*H01S 4/00* (2006.01)

(52) U.S. Cl. ........................................................ 250/251

(58) Field of Classification Search .................. 250/251
See application file for complete search history.

(56) References Cited

U.S. PATENT DOCUMENTS

| | | | | |
|---|---|---|---|---|
| 6,314,809 | B1 * | 11/2001 | Kasevich et al. | 73/382 R |
| 7,126,112 | B2 | 10/2006 | Anderson et al. | |
| 2005/0199871 | A1 * | 9/2005 | Anderson et al. | 257/14 |
| 2006/0169882 | A1 * | 8/2006 | Pau et al. | 250/281 |
| 2007/0158541 | A1 * | 7/2007 | Katori | 250/281 |
| 2010/0207016 | A1 * | 8/2010 | McBride et al. | 250/251 |

OTHER PUBLICATIONS

Santos et al. "Efficient magneto-optical trapping of metastable helium gas", arXiv:physics available online Mar. 20, 2001.*
Reichel, J., "Microchip Traps and Bose-Einstein Condensation." Appl. Phys. B, vol. 74, p. 469 (2002).

* cited by examiner

*Primary Examiner* — Robert Kim
*Assistant Examiner* — Nicole Ippolito Rausch
(74) *Attorney, Agent, or Firm* — Lowenstein Sandler PC

(57) ABSTRACT

The present invention provides an improved cold-atom system having multiple chambers such that a first of the chambers includes an atom source. The system also includes an atom trap disposed inside a second of the chambers. A fluidic connection is provided between the first of the vacuum chamber and the second of the vacuum chamber.

20 Claims, 6 Drawing Sheets

CHANNEL CELL SYSTEM

CROSS-REFERENCE TO RELATED APPLICATION

This application claims priority benefit of U.S. Provisional Application Ser. No. 61/030,335 filed Feb. 21, 2008, which is hereby incorporated by reference in its entirety.

BACKGROUND OF THE INVENTION

This application relates generally to channel cell system. More specifically, this application relates to a multi-chamber miniaturized integrated atom system.

Ultra-cold matter science has been a blossoming field of atomic physics since the realization of a Bose-Einstein condensate in 1995. This scientific breakthrough has also opened the way for possible technical applications that include atom interferometers such as might be used for ultrasensitive sensors, time and frequency standards, and quantum information processing. One approach for developing technology involving ultra-cold matter, and particularly ultra-cold atoms, is the atom chip. Such chips are described in, for example, J. Reichel, "Microchip traps and Bose-Einstein condensation," Appl. Phys. B, 74, 469 (2002), the entire disclosure of which is incorporated herein by reference for all purposes. Such atom chips typically use currents in micro-fabricated wires to generate magnetic fields to trap and manipulate atoms. This chip approach allows for extremely tight confinement of the atoms and potential miniaturization of the apparatus, making the system compact and portable. But despite this, most atom-chip apparatus are of the same size scale as conventional ultra-cold atom systems, being of the order of one meter on one edge.

Current cold-atom and ion applications generally use an ultrahigh vacuum apparatus with optical access. The vacuum chamber of an atom chip typically provides an ultrahigh vacuum with a base pressure of less than $10^{-9}$ torr at the atom-chip surface. It also provides the atom chip with multi-line electrical connections between the vacuum side of the microchip and the outside. Optical access may be provided through windows for laser cooling, with a typical system having 1 $cm^2$ or more optical access available from several directions. A source of atoms or ions is also included.

Most conventional ultra-cold matter systems use multiple-chamber vacuum system: a high vapor-pressure region for the initial collection of cold atoms and an ultrahigh-vacuum region for evaporation and experiments. Chip-based systems have significantly relaxed vacuum requirements compared to their free-space counterparts, and many have used single vacuum chamber, modulating the pressure using light-induced atomic desorption. This approach may be problematic because it requires periodic reloading of the vacuum with the atom to be trapped, which in turn prevents continuous operation of the device. In addition, most ultra-cold matter vacuum systems use a series of pumps: typically a roughing pump, a turbo pump, one or more ion pumps, and one or more titanium sublimation pumps. Such systems are large, costly, and poorly suited to applications for which small size, low weight, and low power consumption are emphasized.

There is accordingly a need in the art for improvements to systems for handling cold atoms.

BRIEF DESCRIPTION OF THE DRAWINGS

The present invention will be more readily understood from the detailed description of exemplary embodiments presented below considered in conjunction with the attached drawings, of which.

SUMMARY OF THE INVENTION

The present invention provides a channel cell system having a plurality of vacuum chambers disposed on a substrate. The plurality of the vacuum chambers includes an interior section and an exterior section. A first of the vacuum chambers includes an atom source and at least one atom trap is disposed in the interior section of a second of the vacuum chambers. Also, a fluidic connection is provided between the first of the vacuum chambers and the second of the vacuum chambers.

In one embodiment of the present invention, the atom trap is an atom chip having conductive traces on both sides of the chip to simultaneously create magnetic fields to trap and manipulate the atoms on both of the sides. In another configuration the conductive traces on the atom chip create electric fields to trap and manipulate ions.

In another embodiment of the present invention, the atom trap is a TOP trap having at least four conductors to create a rotating magnetic field to trap and manipulate atoms simultaneously.

DETAILED DESCRIPTION OF THE INVENTION

Embodiments of the invention provide an improved cold-atom system that comprises a plurality of vacuum chambers. One of the vacuum chambers includes an atom source and another of the vacuum chambers includes an atom chip located inside the chamber. A fluidic connection is provided between the vacuum chambers. Also, electrical feed-throughs are provided at different locations in exterior walls of the vacuum chambers to supply electrical power to the interior of the vacuum chambers.

In some embodiments, the atom chip is replaced by a different type of atom trap, sometimes called time-orbiting potential (TOP) trap. This trap is also located inside the vacuum cell and provides the necessary magnetic fields for atom trapping and manipulation, including the implementation of an atom interferometer.

The embodiments of the present invention in which the atom chip or a TOP trap is provided inside the vacuum cell reduces the fabrication complexity and cost of the atom chip or TOP trap and also eliminates the requirement of the atom chip or TOP trap of being part of the vacuum seal of the cell, therefore increasing reliability. In addition, it enables new configurations such as atom chips where atoms can be trapped and manipulated simultaneously in both sides of the atom chip, providing advantages for parallel processing of cold atoms. Furthermore, it allows a better thermal dissipation of the heat generated by the currents on the atom chip or the TOP trap by thermal conduction of the heat to the integrated atom system main substrate.

Figure 1:
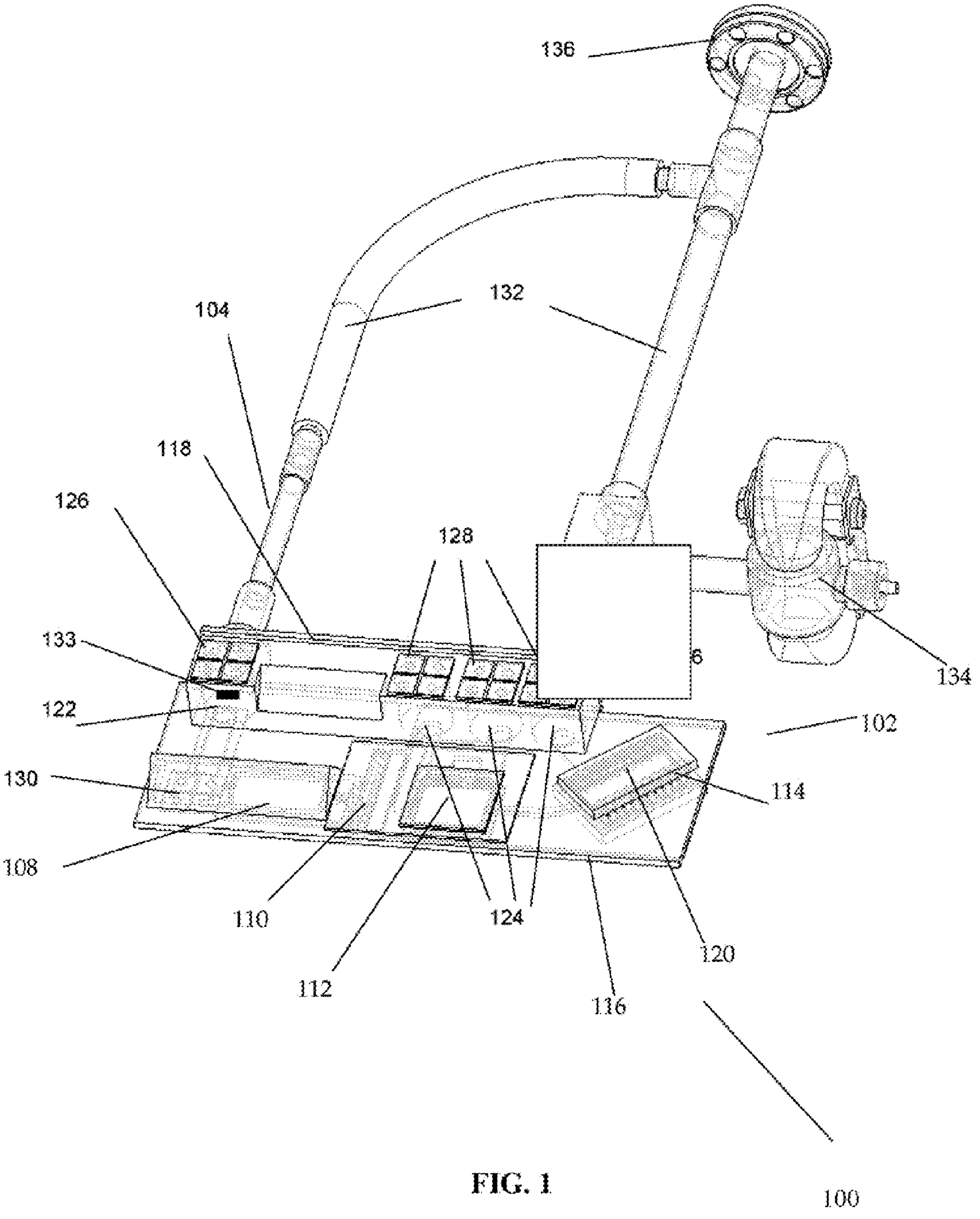
FIG. 1 illustrates a miniaturized integrated atom system in accordance with one embodiment of the present invention.

FIG. 1 of the present invention illustrates a miniaturized integrated atom system 100 in accordance with one embodiment of the present invention. The system 100 consists of a micro-channel assembly 102 connected to a high-pressure port 104 and a low-pressure port 106. The micro-channel assembly 102 comprises a plurality of chambers or cells that may include, depending on the specific characteristics of the embodiment, a high pressure vacuum chamber or cell 108, one or more buffer cells 110, a faux cell 112, and/or low-pressure vacuum chamber or cell 114. In one preferred embodiment, it is noted that the chamber 114 is aligned in a curve with respect to the faux cell 112 in order to prevent the laser light from the faux cell 112 to reach the chamber 114. Thus, this alignment optically isolates the chamber 114 from the faux cell 112. This optical isolation ensures that cold atoms that are further being manipulated in chamber 114 are not perturbed by the laser light of adjacent chambers such as the faux cell chamber 114. Cold atoms are very sensitive to laser light near their absorption spectra. This allows for multiple, simultaneous, and independent cooling and manipulation of atoms in separated chambers.

The chambers or cells are securely placed on a substrate 116 and are connected by micro-channel structures (as described below) formed on the substrate 116. In addition, the micro-channel assembly 102 may comprise a manifold 118. The components of the micro-channel assembly 102 may be fabricated from any of a variety of materials according to the specific embodiment, but in one embodiment comprise glass and silicon that have been assemble together through the use of anodic bonding. As will be known to those of skill in the art, anodic bonding is a technique in which the components to be bonded are placed between metal electrodes at an elevated temperature, with a relatively high dc potential being applied between the electrodes to create an electric field that penetrates the substrates. Dopants in at least one of the components are thereby displaced by application of the electric field, causing dopant depletion at a surface of the component that renders it highly reactive with the other component to allow the creation of a chemical bond. Alternative assembly techniques that may be used, particularly different kinds of materials are used, include direct bonding techniques, intermediate layer bonding techniques, and other bonding techniques. In other instances, other assembly techniques that use adhesion, including the use of a variety of elastomers, thermoplastic adhesives, or thermosetting adhesives may be used.

The high-pressure port 104 may also be fabricated from a variety of different materials in different embodiments, and in one specific embodiment is fabricated from stainless steel. The high-pressure port 104 comprises a port chamber 122 with electrical feed-through 126, a pinch-off tube 132*a*, and a high-pressure pumping port 136.

The low-pressure port 106 has a similar structure and may also be fabricated from a variety of different materials in different embodiments, but is fabricated from stainless steel in one specific embodiment. The low-pressure port 106 comprises port chambers 124 with electrical feed-throughs 128, the pinch-off tube 132*b*, an ion pump 134, and a low-pressure pumping port 106.

As used herein, references to "high" and "low" pressures in describing ports, chambers, and other components are intended to be relative, with such designations indicating merely that a pressure in a high-pressure component is higher than a pressure in the corresponding low-pressure component. Such designations are not intended to limit the absolute pressure in any particular component to any particular value or range of values. Merely by way of illustration, in one embodiment, the pressure in the high-vacuum chamber or cell 108 is on the order of $10^{-8}$-$10^{-6}$ torr and the pressure in the low-vacuum chamber or cell 114 is on an order less than $10^{-11}$ torr.

As illustrated in FIG. 1, the high-pressure port 104 and the low-pressure port 106 are coupled respectively to the manifold 118 via their corresponding pinch-off tubes 132*a* and 132*b* respectively. Such coupling may be achieved in a variety of different ways, depending in part on the specific materials used in the structure. For instance, in one embodiment in which the manifold 118 comprise glass, the ports 104 and 106 are coupled with the manifold 118 by a glass-metal transition. Also, the pinch off tube 132*a* of the high-pressure port 104 and pinch-off tube 132*b* of the low-pressure port 106 are joined together to share the pumping port 136. The Pumping port 136 is connected to an external vacuum pump system for vacuum processing.

An atom source 133 such as an alkali metal dispenser are preferably disposed inside the chamber 122 and/or high-pressure chamber 108, and are attached to electrical feed-throughs 126 and 130. In one embodiment, the alkali-metal dispenser 488 comprises a rubidium dispenser, but this is not a requirement of the invention and other types of atoms, ions or molecules may be dispensed in alternative embodiments. Similarly, gas getter and alkali metal pumps or getters are also disposed inside the chambers 124, and are attached to electrical feed-throughs 128. Gas getters can be non-evaporative getters, titanium sublimation pumps and others known in the art. Getters and dispensers are in some cases attached by spot welding to electrical feed-throughs. The function of the getters and pumps is to remove any byproduct gases and any un-trapped alkali metal present inside the vacuum system. The getters, dispensers and pumps are activated and controlled by heaters that are commanded by electrical currents.

In addition, an atom chip and waveguide device 120 is disposed inside the low-pressure chamber or cell 114. The atom chip is supported preferably on the interior walls of the low-pressure chamber or cell 114. In one embodiment the atom trap and waveguide 120 is a substrate with conducting traces that provides magnetic fields for cold atom manipulation and trapping, or electric fields for ion trapping and manipulation. In this case the atoms are trapped and manipulated very close to the substrate surface. This embodiment is sometimes referred as an "atom chip". The atom chip 120 is preferably made of silicon, aluminum nitride and other substrate materials with similar properties to silicon or glass. Even though, only one atom chip 120 is shown to be placed inside the vacuum chamber 114, two or more atom chips 120 may preferably be disposed in the chamber 114.

The system 100 is typically configured with an adequate interior vacuum. This may be accomplished by fluidic coupling of the pumping ports 136 with an external vacuum pump system, allowing vacuum processing of the system. Once an adequate vacuum is attained within the atom system, the pinch-off tubes 132*a* and 132*b* are closed; closure of the pinch-off tubes may be achieved by crimping pinch-off tubes 132*a* and 132*b* made of a metal such as copper, but flame-sealing pinch-off tubes 132*a* and 132*b* made of a glass, or by any other technique suitable for the material comprised by the pinch-off tubes 132*a* and 132*b*.

Figure 2A:
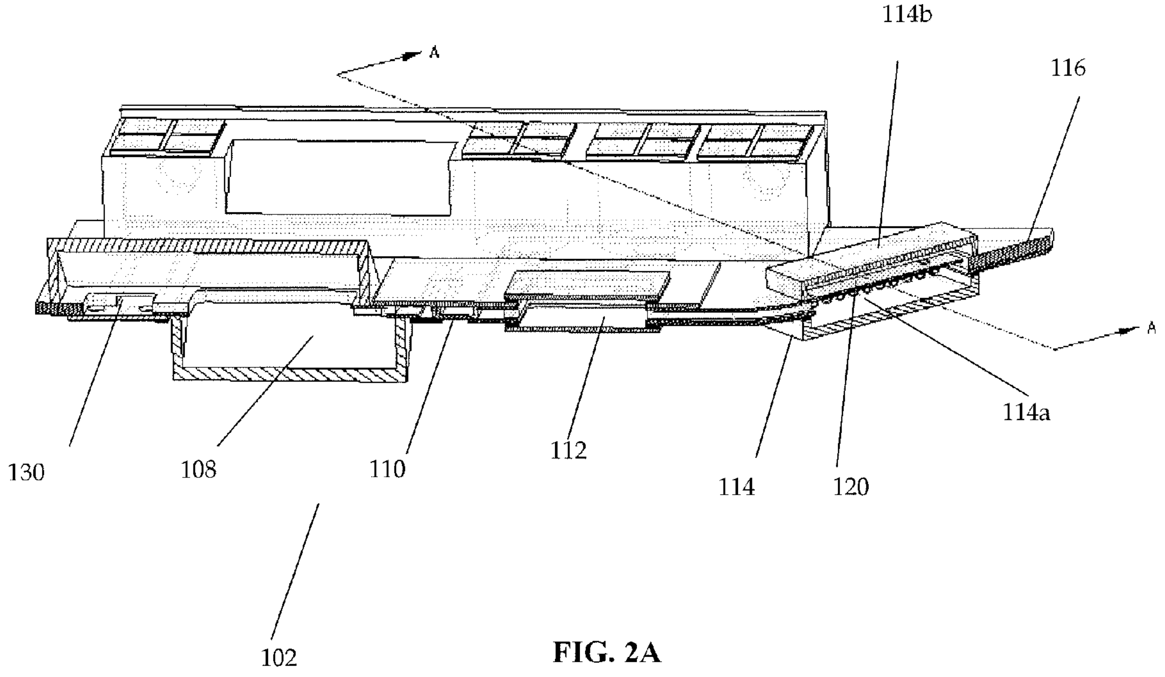
FIG. 2A illustrates the micro-channel assembly with an atom chip trap and waveguide of the system of FIG. 1.

FIG. 2A illustrates the micro-channel assembly 102 with an "atom chip" trap and waveguide. As used herein, "micro-channel" assembly includes structures that have a groove cut into a flat surface that is covered by another layer, such as where a groove has been cut into a silicon surface that is covered by glass. The vacuum chamber 114 includes an interior section 114a and an exterior section 114b. As shown, the atom chip 120 is disposed in the interior section 114a of the chamber 114 and is supported on the substrate 116.

Figure 2B:
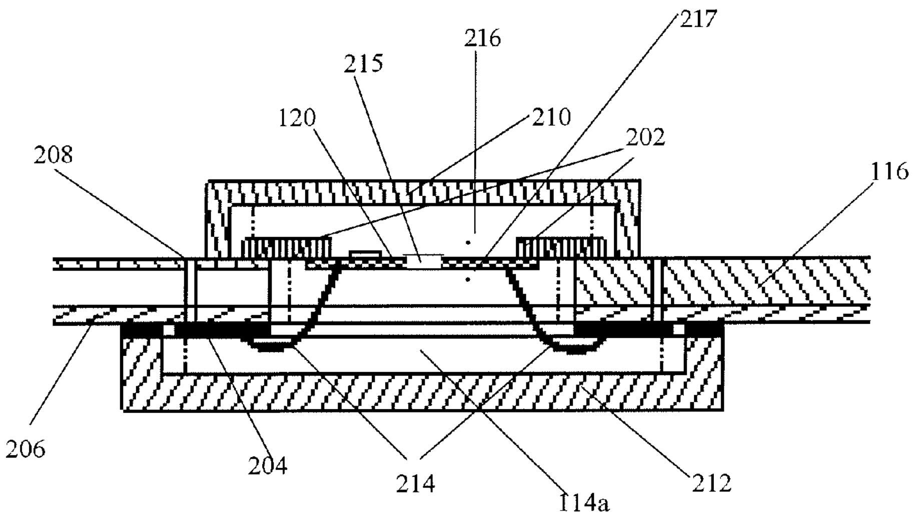
FIG. 2B illustrates the cross-section view along line A-A of the low pressure cell of FIG. 2A.

FIG. 2B illustrates the cross-section view along line A-A of the low pressure chamber or cell 114 with the details of the atom chip 120 located in the interior section 114a of the chamber 114. The chamber 114 is supported on the substrate 116 by bridges 202. The bridges 202 are preferably made of glass, silicon or aluminum nitride. Electrical traces are formed on top of the atom chip substrate by well known lithographic and etching techniques. The atom chip 120, the bridges 202 and the substrate 116 are attached together preferably by anodic bonding technique. Silicon or aluminum nitride will provide better thermal conductivity to substrate 116 to remove the heat generated in the atom chip. A conducting substrate 204, preferably made of a metal alloy, or a highly conductive semiconductor with ohmic contacts is bonded to the substrate 116. A glass interface 206 as shown in FIG. 2B serves the purpose of providing electrical isolation and also being an interface for anodic bonding between the conducting substrate 204 and the substrate 116. Also, shown are wire bonds 214 which provide an electrical connection from the atom chip 120 to the conducting substrate 204. The exterior section 114b of the chamber 114 is formed by two cover glass cells 210 and 212 as shown in FIG. 2B. These glass cells 210 and 212 are anodically bonded to the substrate 116. As illustrated in FIG. 2B, electrical signals are supplied to the internal atom chip 120 by vacuum feed-throughs formed by a conducting substrate 204, a glass interface 206 and a hole 208. In this embodiment, the atom chip 120 can have conducting traces on both surfaces to generate magnetic fields for simultaneous atom trapping and manipulation on both sides of the atom chip. The atoms are located near the surface of the atom chip on both sides, in any location within the area of the atom chip. For illustration, 216 and 217 indicate one of many possible locations for the atoms on both sides of the atom chip. The location of the atoms on one side does not have to be symmetric or mirror image of the location on the other side. In other embodiment, the atom chip 120 can have conducting traces on one surface to generate magnetic fields for atom trapping and manipulation on one side of the atom chip. In addition the atom chip can be very thin, preferably in the order of tens of micrometer, to create more complex magnetic field patterns with closely spaced conducting traces on both sides of the atom chip. The atom chip 120 may also preferably have apertures or open windows 215 as shown in FIG. 2B to connect both sides of the atom chip.

The mode of operation of the cold-atom system of FIG. 1 is described herein. Initially, the alkali-metal vapor is loaded into the high-vacuum chamber 108 from the alkali metal dispenser 133 disposed in the chamber 122. The alkali metal vapor will preferably move from chamber 122 to the high pressure chamber 108 by molecular flow through a fluid connection between the chambers. A cloud of cold atoms is formed in the high-vacuum chamber 108, which may be accomplished using conventional cold-atom techniques know to those of skill in the art, such as by using a magneto-optical trap (MOT) to form as an example a two dimensional (2D) MOT. The cold atoms are transported from the high-vacuum chamber 108 to the faux cell 112. This may be accomplished by conveying the cloud of cold atoms along micro-channels and across buffer cells 110. The buffer cells 110 are used for differential vacuum pumping, as well as for providing thermal and optical isolation. In addition, the buffer cells 110 are used to trap or getter free alkali-metal atoms that are not trapped in the two-dimensional (2D) MOT.

Once the cold atoms reach the faux cell 112, the cloud is trapped in three-dimensional (3D) magneto-optical trap (MOT) using conventional cold-atom techniques. These cold atoms trapped in the 3D MOT are then transported to the low-vacuum chamber 114 using magnetic fields such as movable magnetic field. One embodiment for this magnetic transfer mechanism has been described in detail in PCT Patent Application No. PCT/US08/64149 entitled, “Channel Cell System”, filed May 19, 2008, disclosure of which is incorporated by reference herein. Once the atoms reach the low-vacuum chamber 114, they are trapped in magnetic field present on the atom chip 120. These fields are formed by passing electrical currents through conductive traces on the surface of the atom chip 120, combined with bias fields that can be generated externally to the system. Conventional cooling techniques known to those of skill in the art are applied to condense the atoms within the atom chip 120 and thereby form a Bose-Einstein condensate.

It is noted that while specific steps described above are in a particular order, however, variations may be made without departing from the intended scope of the invention. In alternative embodiments, some of the steps might be omitted and/or additional steps not specifically identified in the drawing might also be included. Also, while the operation is discussed in connection with the cold-atom system of FIG. 1, it is noted that the method may be practiced with other system structures. Furthermore, the mode of operation of the cold-atom system described above is provided in greater detail in PCT Patent Application No. PCT/US08/64149 entitled, “Channel Cell System”, filed May 19, 2008, disclosure of which is incorporated by reference herein.

Figure 3:
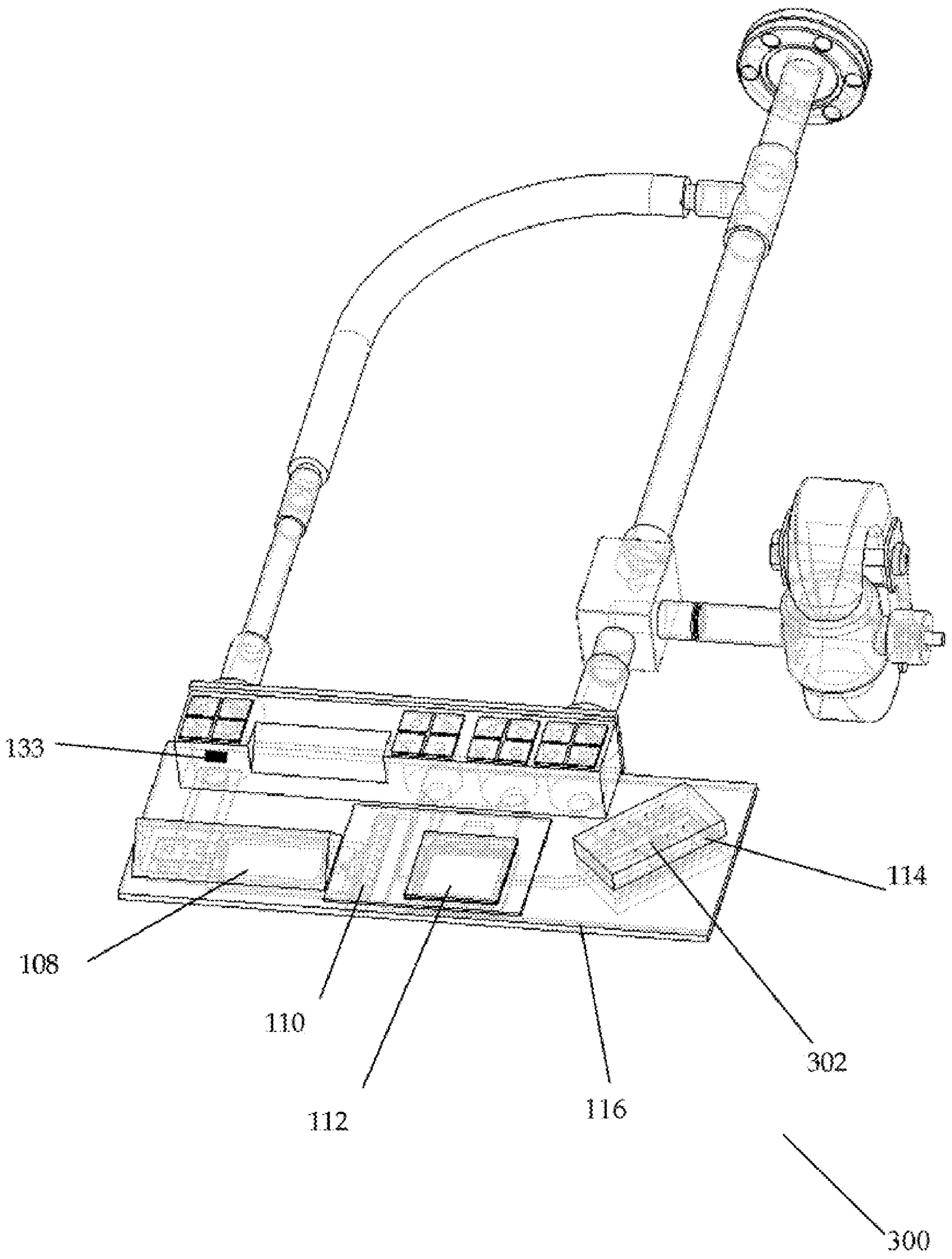
FIG. 3 illustrates a miniaturized integrated atom system in accordance with another embodiment of the present invention.
Figure 4A:
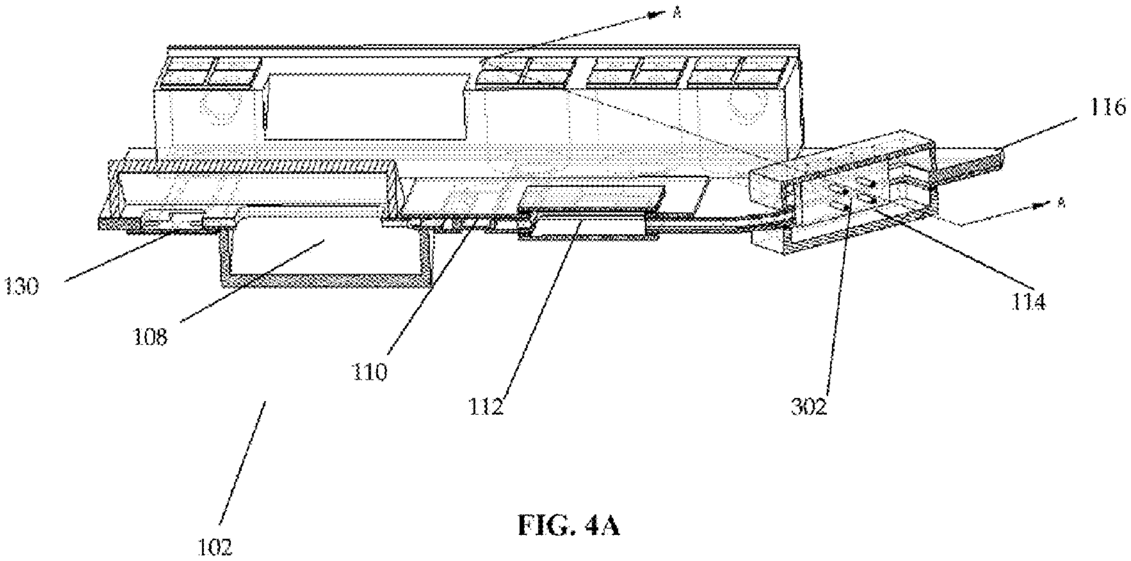
FIG. 4A illustrates the micro-channel assembly with a TOP trap and waveguide of the system of FIG. 3.

In another embodiment of the present invention, the atom trap and waveguide 120 is a free space trap and waveguide 302 such as described and illustrated in the miniaturized integrated atom system 300 in FIG. 3. This configuration is known as a time-orbiting potential (TOP) trap and consists of a four-wire linear quadrupole with an additional oscillating bias field. This four-wire linear quadrupole creates a rotating magnetic field which traps the atoms. The TOP trap is known to one skilled in the art. FIG. 4A illustrates a cross section of the micro-channel assembly 102 with a “TOP” trap and waveguide 302. As shown, the TOP trap 302 is disposed in the interior section 114a of the low pressure chamber 114 and is supported on the substrate 116. Even though, only one TOP trap 302 is shown to be placed inside the vacuum chamber 114, two or more TOP traps 302 may preferably be disposed in the chamber 114. In a preferred embodiment, the TOP trap 302 is placed in the middle of the interior section 114a of the chamber 114 in order to minimize any surface interactions with the cold trapped atoms.

Figure 4B:
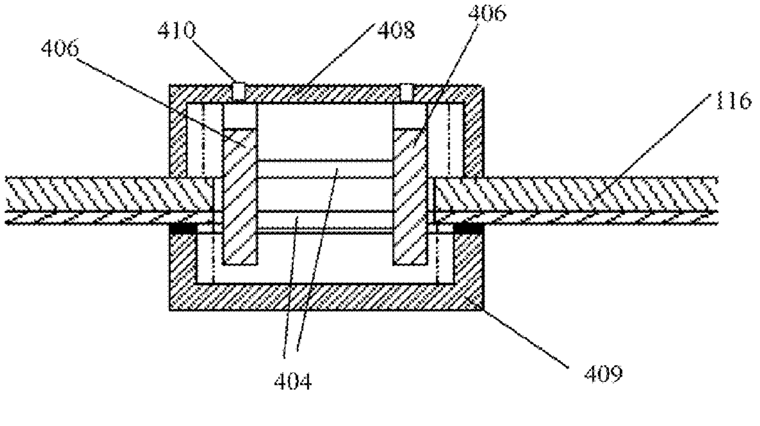
FIG. 4B illustrates the cross-section view along line A-A of the low pressure cell of FIG. 4A.

FIG. 4B illustrates the cross-section view along line A-A of the low pressure chamber or cell 114 with the details of trap 302 inside the chamber 114. The trap 302 consists of four coaxial conductors 404 that are held in place by a support bar 406 on each side as shown. Support bar 406 preferably provides mechanical support and also serves as a substrate for electrical conducting traces formed on its surface. The assembly of supports 406 and the coaxial conductors 404 is attached to a cover cell 408 preferably by anodic bonding technique. The Cover cell 408 is preferably made of glass but can also be made of aluminum nitride to serve as heat conduction and heat dissipation device. The cover cell 408 is attached to the substrate 116 preferably by anodic bonding technique. The other side of the low-pressure cell 114 is also formed by another cover cell 409 that is also attached to substrate 116 as shown in FIG. 4B. The assembly also includes holes 410 on the cover 408 for providing electrical contacts from the support 406 to the outside of the vacuum cell 114.

Figure 4C:
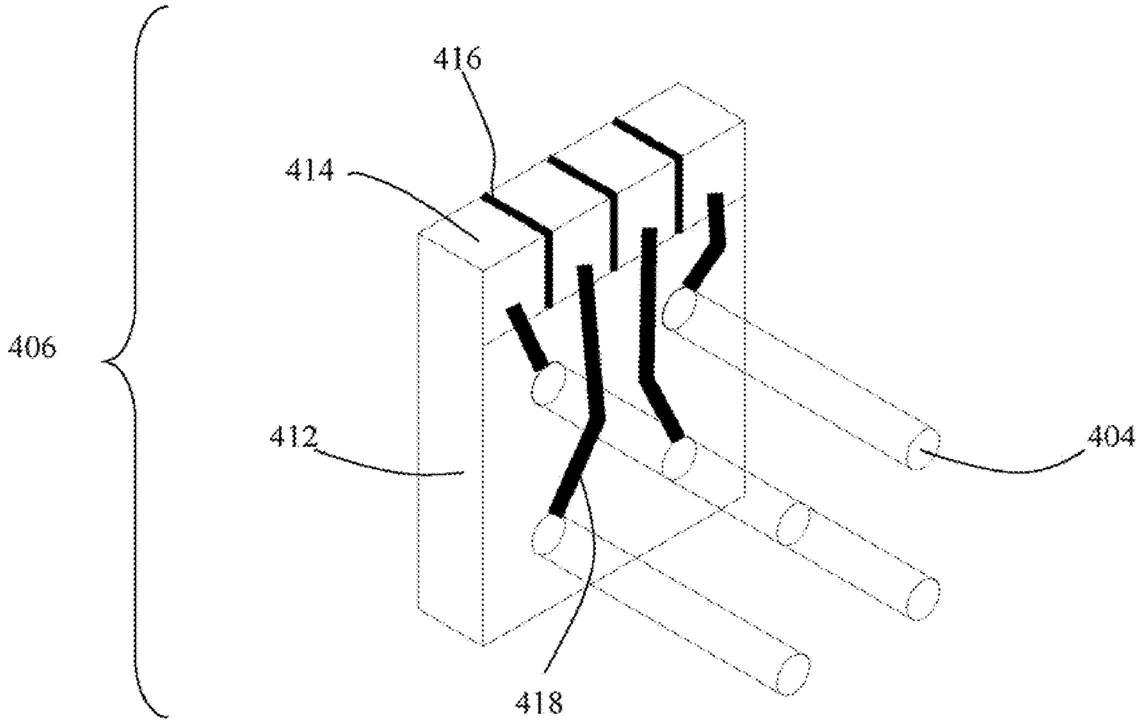
FIG. 4C shows a detailed illustration of the support of the low pressure cell of FIG. 4B.

FIG. 4C shows a detailed illustration of the support bar 406. It consists of a block 412 made of an insulating material such as aluminum nitride with electrical traces formed on its surface. Block 412 can be also made of glass or silicon with insulating silicon oxide layers. Block 412 also supports the coaxial conductors 404. A stack of alternating conducting material 414 and insulating material 416 is attached to the block 412 as shown. The conducting material 414 is preferably a highly conductive semiconductor such as highly doped silicon. The insulating material 416 is preferably made of glass but it may preferably be a spacing or a gap. Conducting traces 418 provide a connection from the conductors 404 to the conducting material 414. The support bar 406 is anodically bonded to the cover cell 408 such that holes 410 align with the center of conducting material 414 of the support bar 406 in order to provide a contact to the outside of the cell and also to provide a vacuum seal.

As discussed above, the magnetic trap and waveguide, present on the atom chip and/or the TOP trap, are used to generate the necessary magnetic fields. These magnetic fields combined with light radiation form an atom interferometer as will be described in greater detail below.

Figure 4D:
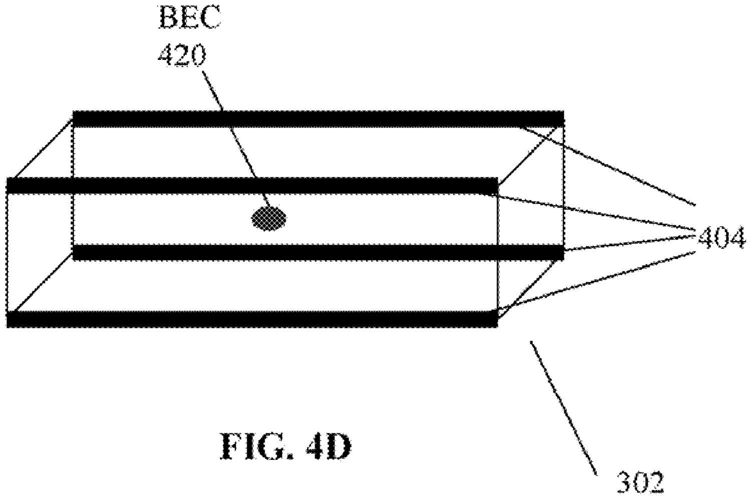
FIG. 4D illustrates the location of the BEC with respect to the trap for the TOP trap of FIG. 4B.
Figure 4E:
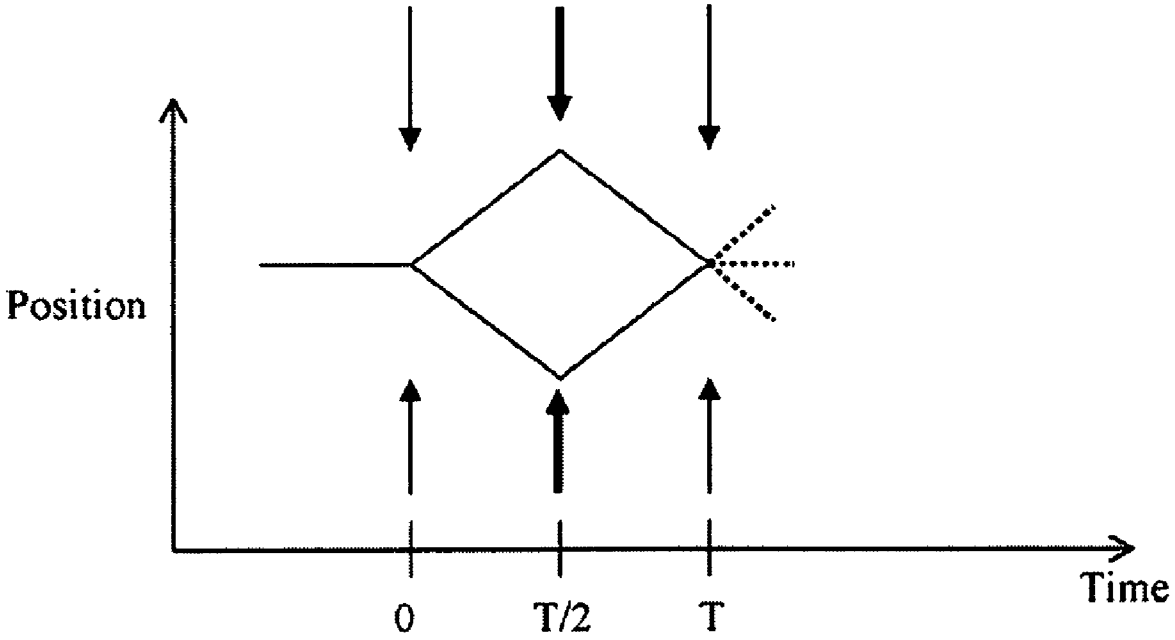
FIG. 4E illustrates the trajectory of the atoms in the interferometer after attainment of the BEC of FIG. 4D.

FIG. 4D illustrates location of a Bose-Einstein condensate (BEC) 420 with respect to the trap 320 for the TOP trap embodiment. As shown, the BEC 420 is situated in the center of the trap 302 surrounded by the conductors 404. FIG. 4E shows the operation of the atom interferometer, in a graphical representation with respect to this embodiment. After the BEC 420 has been attained in the magnetic trap 302 which is nominally at rest as illustrated in FIG. 4D, at time t=0, an off-resonance laser beam, injected through transparent walls of the vacuum cell 114, illustrated by arrows in FIG. 4E, splits the BEC 420 into two separate cold atom packets that travel in opposite directions. These are two separate cold atoms packets that interact with gravitational fields. At t=T/2, a laser beam is applied, reversing the direction of atom motion towards each other At t=T, a laser combining beam is applied, bringing the atoms to rest with a probability that depends on the relative phase of the combined packets. After t=T, the atoms are imaged to determine the output state, that is the readout of the interferometer.

Features of note with the various embodiments described herein include differential vacuum pumping between the high-pressure and low-vacuum chambers, as well as light isolation, thermal isolation, and magnetic isolation between the chambers. The various structures provide a platform for integration of optics and laser sources directly on the device.

Even though the embodiments described above illustrate the examples of applications such as Bose-Einstein condensation and atom interferometry, the present invention can be used in other applications such as atomic clocks, optical atomic clocks, trapped ion clocks, optical lattices, magnetometers, gravity gradient sensing, atom gyroscopes, etc.

While the present invention has been described with respect to what are some embodiments of the invention, it is to be understood that the invention is not limited to the disclosed embodiments. To the contrary, the invention is intended to cover various modifications and equivalent arrangements included within the spirit and scope of the claims. The scope of the following claims is to be accorded the broadest interpretation so as to encompass all such modifications and equivalent structures and functions.

What is claimed is:

1. A channel cell system comprising:

a substrate;

a plurality of separate vacuum chambers integrated on the substrate, said vacuum chambers having an interior section and an exterior section, a first of the separate vacuum chambers including an atom source;

at least one atom trap disposed in the interior section of a second of the separate vacuum chambers; and a fluidic connection between the first separate vacuum chambers and the second separate vacuum chambers.

2. The system of claim 1 wherein said atom trap is an atom chip having conductive traces on its surface, wherein said conductive traces create magnetic fields to trap and manipulate atoms.

3. The system of claim 2 wherein said atom trap is an atom chip having conductive traces on both sides of the chip, wherein said conductive traces create magnetic fields to trap and manipulate atoms on said both sides of the chip simultaneously.

4. The system of claim 2 wherein said atom chip comprising at least one aperture to connect said both sides of the chip.

5. The system of claim 1 wherein said atom trap is an atom chip having conductive traces on its surface, wherein said conductive traces create electric fields to trap and manipulate ions.

6. The system of claim 5 wherein said atom trap is an atom chip having conductive traces on both sides of the chip, wherein said conductive traces create electric fields to trap and manipulate ions on said both sides of the chip simultaneously.

7. The system of claim 5 wherein said atom chip comprising at least one aperture to connect said both sides of the chip.

8. The system of claim 1 wherein said atom trap is a time-orbiting potential (TOP) trap having at least four conductors, wherein said conductors create magnetic fields to trap and manipulate atoms.

9. The system of claim 8 wherein said TOP trap is disposed in middle portion of the interior section of the second of the vacuum chamber.

10. The system of claim 8 wherein said conductors are supported by a support bar and attached to a cover cell by anodic bonding.

11. The system of claim 10 wherein said cover cell comprises an opening to provide electrical contacts from the support bar in the interior section of the second vacuum chamber to the exterior section of the second of the vacuum chamber.

12. The system of claim 1 wherein said atom trap is disposed on interior walls of the second of the vacuum chamber.

13. The system of claim 1 wherein said second of the vacuum chamber is placed in a curve position with respect to the first of the vacuum chamber to provide optical isolation to the second of the vacuum chamber.

14. The system of claim 1 further comprising electrical feed-throughs located at walls of the exterior section of the vacuum chambers to supply electrical power to the interior section of the plurality of the vacuum chambers.

15. The system of claim 1 wherein the atom source forms a cloud of atoms via a cold-atom technique in the first of the vacuum chamber.

16. The system of claim 15 further comprising a mechanism to transport the atoms through a micro-channel from the first of the vacuum chamber to the second of the vacuum chambers.

17. The system of claim 16 wherein said atoms are trapped by the atom trap in said second of the vacuum chambers.

18. The system of claim 15 wherein said atoms are condensed to form a Bose-Einstein condensate in said second of the vacuum chambers.

19. The system of claim 15 wherein said atoms are manipulated to form an atom interferometer in said second of the vacuum chambers.

20. A method for handling cold atoms, the method comprising:

integrating at least a first chamber and at least a second chamber onto a substrate;

producing cold atoms in the first chamber;

transferring said cold atoms from the first chamber to the second chamber, said second chamber having a lower internal pressure than an internal pressure of the first chamber; and providing an atom trap in an interior of the second chamber to trap and manipulate said atoms.

* * * * *